United States Patent [19]
Breston

[11] Patent Number: 4,509,329
[45] Date of Patent: Apr. 9, 1985

[54] GRAVITY-ACTUATED THERMAL ENGINES

[76] Inventor: Michael P. Breston, 102 Plantation, Houston, Tex. 77024

[21] Appl. No.: 421,972

[22] Filed: Sep. 23, 1982

[51] Int. Cl.³ ............................ F03G 3/00; F03G 7/06
[52] U.S. Cl. ......................................... 60/531; 60/721
[58] Field of Search ................. 60/675, 527, 530, 531, 60/721

[56] References Cited

U.S. PATENT DOCUMENTS

| | | | |
|---|---|---|---|
| 981,316 | 1/1911 | Savoie | 123/44 |
| 3,984,985 | 10/1976 | Lapeyre | 60/675 |
| 4,222,241 | 9/1980 | Wardman et al. | 60/531 |
| 4,344,286 | 8/1982 | Warner | 60/531 |

FOREIGN PATENT DOCUMENTS

| | | | |
|---|---|---|---|
| 422085 | 6/1947 | Italy | 60/675 |
| 113072 | 9/1981 | Japan | 60/527 |
| 9506 | of 1887 | United Kingdom | 60/675 |
| 3757 | of 1893 | United Kingdom | 60/675 |
| 17600 | of 1905 | United Kingdom | 60/675 |

Primary Examiner—Allen M. Ostrager
Assistant Examiner—Randolph A. Smith
Attorney, Agent, or Firm—Michael P. Breston

[57] ABSTRACT

The power engine includes at least two separate fluid-tight enclosures. A solid mass is associated with each enclosure. A coupling rigidly interconnects the enclosures. A pivot shaft defines an axis of rotation and pivotally supports the engine for rotation from a first position, whereat a first enclosure is located at a first level above the axis of rotation, to a second position, whereat the first enclosure is located at a second level below the axis of rotation. A motive fluid is enclosed within each enclosure whose pressure varies in response to temperature changes. Each solid mass is movable in response to a pressure change in its associated enclosure. The engine is responsive to alternating thermal effects which cause alternating variations in the pressures of the enclosures resulting in alternating shifts of the center of gravity of the engine, thereby rotating the engine about the axis of rotation.

21 Claims, 10 Drawing Figures

GRAVITY-ACTUATED THERMAL ENGINES

BACKGROUND OF THE INVENTION

1. Field of the Invention

This invention relates to thermal, gravity-actuated devices, such as thermal converters, engines, etc., and in particular to solar, differential-temperature engines having a movable solid weight which is shifted in direct response to pressure changes between separate vapor chambers, each containing a volatile fluid, oppositely disposed on a rotor relative to the rotor's axis of rotation.

2. Description of the Prior Art

Various types of converters are known for transforming heat energy into mechanical energy. One type of converter, known in the art as a differential-temperature converter or engine, operates on the basis of a vapor pressure differential between a warm vapor chamber and a cold vapor chamber. The operation of the engine requires gravitational forces, an evaporation of the liquid in the warm chamber, and a condensation of the vapor back into a liquid in the cold chamber. The increasing weight of the condensed liquid causes the pivoting of the system about a rotation axis.

Converters of this type are described, for example, in U.S. Pat. Nos. 4,145,890 and 4,195,486.

Other typical systems of this type include a closed loop circulation of the fluid which is vaporized in vapor chambers, discharged as a high pressure gas to a condenser, and returned as a liquid. The high pressure gas is used to drive a turbine or other rotary machine (see U.S. Pat. No. 4,143,517).

Generally, these differential-temperature engines are constructed by providing a rotatably mounted rotor that supports a plurality of such chambers which are alternately or consecutively exposed to a heat source.

Cyclical vapor pressure changes between the chambers result in cyclic shifts in the mass of the rotor which produce moments of gravitational force, and hence rotation of the output shaft to which the rotor is attached.

Some temperature-differential engines utilize liquid to create a weight imbalance in the rotor; the liquid is transferred to a position which is eccentric with respect to the output shaft's axis of rotation.

The transferred liquid may be the pressure-generating liquid itself, see U.S. Pat. Nos. 250,821, 1,115,524, 1,911,456, 3,509,716 and 3,785,144, or it may be an intermediary liquid to which the pressure is transmitted through a deformable wall, such as a membrane or diaphragm, see for example, U.S. Pat. Nos. 3,984,985, 4,019,325, 4,074,534 and 4,121,420.

In engines utilizing a liquid which is transferred from one side to the opposite side of the rotation axis, there is a need to make use of a connecting channel between diametrically opposite chambers of the engines, which complicates the construction of the engine, particularly in view of the fact that this channel must be associated to structural elements supporting said chambers and it must be also provided with means for pivoting the assembly of the chambers as well as the supporting structural elements about a pivot shaft. In addition, the liquid transfer through said channel results in a pressure drop which decreases. Accordingly, the power produced by the engine, which is based on the transfer of liquid under pressure, results in severe leakage problems.

In the engine described in U.S. Pat. No. 3,984,985 there is used an intermediary liquid partially filling a series of adjacent chambers interconnected through a common annular space. In this engine, a considerable amount of power is lost also as a result of the pressure drops through the channels connecting the chambers with the annular space. In addition, it is doubtful that such a system may produce power with a sufficient yield, since a temperature gradient will establish itself between the adjacent chambers, so that the torque available on the output rotatable shaft will be substantially reduced.

Another engine of this type, which comprises a plurality of adjacent chambers distributed at the periphery of a rotor, is described for example in U.S. Pat. No. 4,121,420. However, to cope with the difficulty arising from the establishment of a temperature gradient, the embodiment disclosed in this patent makes use of means for locking the chambers (including bellows) in expanded position until they have traveled over about one half circle. A complicated mechanism is required to lock and thereafter to release the bellows in the convenient position, all of which makes this engine expensive and uneconomical.

The thermal converters or engines according to this invention are considerably simpler and efficient, since they do not require to transfer liquid under pressure, as is the case in the prior art, thus avoiding the power loss by pressure drop and also eliminating the leakage problems associated with such transfer.

Accordingly, the novel engines of the present invention can operate continuously without having to periodically compensate for the liquid leaks; they are considerably simpler, and they can be manufactured at reduced costs for economical, long-lasting operation.

SUMMARY OF THE INVENTION

The engine of the invention makes use of a rotor having movable solid masses which are associated with each pair of vapor chambers. The shifting of the masses relative to the axis of rotation of the rotor is directly accomplished by the pressures within the warm and cold vapor chambers. Each vapor chamber is fluid tight and contains a volatile liquid. There is no fluid transfer between the chambers. Each chamber is formed of a material which will readily absorb applied thermal energy. The material may be a good thermal conductor such as copper or it may be coated with a heat-absorbing material, for example, a black paint. The warm and cold chambers are sealed from the atmosphere and from each other. The vaporization of the liquid expands the volume of the warm chamber, and the condensation of the vapor into liquid contracts the volume of the cold chamber. The change of volume, and hence pressure, in each chamber displaces its associated movable solid mass. Gravity acts on the shifted masses to produce moments of gravitational force, and hence mechanical energy, at the rotatable output shaft to which the engine's rotor is attached.

In a simple embodiment of the invention, the engine has a rocking rod to the opposite ends of which are secured a pair of cylinders enclosing vapor chambers. The rod is fixedly secured at its center to a pivot shaft. Alternately vaporizing and condensing the fluid in one chamber, while simultaneously alternatingly condensing and vaporizing the fluid in the opposite chamber, produce opposite vapor pressure changes in the two chambers and hence continuous rocking motion by the rocking rod. This reciprocating rotary motion can be converted into unidirectional rotary motion, for example, utilizing a one-way clutch using a known ratchet mechanism.

In a more elaborate engine, two or more unit pairs of opposite vapor chambers are circumferentially disposed about the rotating shaft. The vapor chambers are consecutively heated and their respective opposite chambers are consecutively cooled to provide unidirectional rotary motion to the output shaft. This construction can provide greater efficiency between the thermal input energy and the output mechanical energy, since it eliminates motion converters.

Thus, the present invention aims at eliminating the disadvantages of known differential temperature engines for converting thermal energy into reciprocating rotary motion or into unidirectional rotary motion.

GENERAL DESCRIPTION OF THE INVENTION

Figure 1:
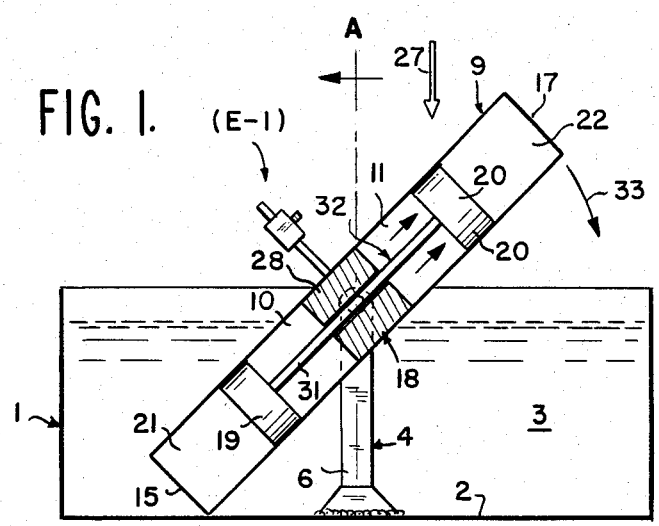
FIG. 1 is a longitudinal schematic representation of one engine embodiment of the present invention wherein the pistons associated with the chambers are mechanically coupled together.

The energy converters of the present invention are of the type primarily used to convert thermal energy into mechanical energy. The energy converters are activated by gravity after successive vaporizations and condensations take place of a low-boiling-point liquid enclosed within each of a unit-pair of opposed vapor chambers. The engine has a rotor which is secured to a rotatable shaft for rotation about the axis of the shaft. The chambers are disposed on the rotor in opposite directions relative to the axis of rotation.

A heat input source, which may be solar heat, waste heat, or a heated body of water, is disposed adjacent to a selected point of the path of travel of each chamber. Each chamber is formed of a material which will readily absorb applied thermal energy. The material may be a good thermal conductor such as copper, or it may be coated with a good heat-absorbent, for example, carbon black. The warm and cold chambers are sealed from the atmosphere and from each other.

Each vapor chamber contains a low-boiling-point liquid (not shown) which vaporizes at a temperature preferably lower than room temperature.

Each chamber is associated with a mass which is movably mounted on the engine's rotor. The mass can be shifted upwardly or downwardly relative to the axis of rotation of the rotor's output shaft. The upward and downward movements of the mass create unbalanced moments of gravitational force which rotate the rotor's output shaft.

In a relatively simple embodiment, the rotor includes only a single pair of chambers oppositely disposed relative to the rotor's axis of rotation resulting in the rotor having a rocking motion about the fulcrum point of the rotor's output shaft. The rocking angle of the rocking rotor can be adjusted by adjustable stationary stop members. The position of each stop member relative to the rotor can be adjusted by any convenient means.

The rocking motion of the rotor results from alternate liquid vaporizations and condensations of the volatile fluid enclosed within the opposed vapor chambers. When the fluid within the warm chamber is heated, it expands and the weight associated therewith moves upwardly, thereby causing a weight imbalance which produces a moment of gravitational force on the rotor's output shaft in one direction about its axis of rotation: the rotor will pivot say clockwise and the previously cold chamber will become exposed to the action of the heat source, while the previously warm chamber becomes the cold chamber. The volatile liquid will vaporize in the warm chamber, and the vapor in the cold chamber will condense.

The mass associated with the warm chamber moves upwardly, again causing a weight imbalance which produces a counter-clockwise moment of gravitional force resulting in the pivoting of the rotor's shaft in a counter-clockwise direction. This process will continually repeat itself to provide a continuous rocking motion due to the alternate vaporizations and condensations of the volatile liquid in the opposed vapor chambers, and to the forces of gravity exerted on the masses when shifted by the pressures prevailing in the chambers.

Depending on the mass associated with a vapor chamber and the length of the rotor, considerable energy may be available on the output shaft due to the continuous see-saw motion of the rotor.

It will be appreciated that the pressure built up in the warm chamber, after overcoming the resistance to movement by the mass associated with the warm chamber, is directly effective upon the mass to produce the cyclic moments of gravity force on the output rotational shaft. Furthermore, while the opposed chamber is being cooled, a reduced pressure is generated therein, thereby assisting the upward movement of the mass which is being pushed upwardly by repelling means associated with the mass.

The rotors can be constructed utilizing several unit-pairs of vapor chambers which are consecutively exposed to the heat source. A sun shield may be provided over a portion of the area of movement of the chambers so that a particular chamber is heated only when it moves out of the shade of the shield. In this manner, only one chamber will be exposed at a time to the radiant energy of the sun rays to thereby shift its associated mass outwardly, resulting in an unbalance of moments of gravitational force which are translated into a continuous rotation by the rotor's output shaft. Those chambers which are shielded from the sun rays will have their vapors condensed. The cooling of the cold chambers can be reinforced by immersing them into a body of coolant such as cooling water.

It will be appreciated that in accordance with the present invention the need to transfer liquid under pressure from one chamber to the other chamber has been eliminated together with the attendant problems of leakage and of power losses due to the pressure drops, which are associated therewith.

DETAILED DESCRIPTION OF ILLUSTRATIVE EMBODIMENTS

With reference to the drawings in general, the condensation is accomplished by heat extraction or cooling means which conveniently may include a large reservoir 1 having a bottom 2 and being filled with a large body of cold water 3. An upright stationary support 4 is disposed in the reservoir 1. Support 4 has a pair of upright legs 5 and 6 for rotatably supporting a shaft 7 having an axis of rotation 8. A volatile liquid fills a portion of the volume in a pair of fluid-tight, separate chambers 10 and 11 which have no fluid communication therebetween. The fluid contained in each chamber must have a liquid phase in equilibrium with a vapor phase whose pressure increases with temperature. Any fluid which vaporizes at the temperature of the heat source may be convenient.

A preferred fluid is selected from n-butane, isobutane, propane, ethane, methane, methylchloride, ammonia, liquid carbon dioxide, and halogenated hydrocarbons boiling below 20° C.

Chambers 10 and 11 can be enclosed within a single cylinder 9 (FIG. 1) or within two cylinders 12 and 13 (FIG. 3), respectively. Cylinder 12 has an inner end wall 14 and an outer end wall 15; cylinder 13 has an inner end wall 16 and an outer end wall 17. Cylinders 12 and 13 are rigidly interconnected by a coupling member 18.

Associated with chambers 10, 11 (FIG. 3) are movable masses 19, 20, respectively. When the chambers are within cylinders, their movable masses 19, 20 can be pistons which are sealingly and slidably displaceable within the cylinders. The sealed vapor chamber 10 is defined between wall 14 and piston 19. The sealed vapor chamber 11 is defined between wall 16 and piston 20. Both vapor chambers 10, 11 contain a volatile liquid. Between piston 19 and outer wall 15 is formed an end chamber 21, and between piston 20 and end wall 17 is formed an end chamber 22.

An inertia mass 23 is associated with the coupling member 18. Mass 23 may be slidably mounted on a guide shaft 24 and fixedly secured thereto by a screw 25. Shaft 24 is rigidly secured and is perpendicular to coupling member 18. Chambers 10 and 11, coupling member 18, guide shaft 24, and inertia mass 23 constitute together a rotor, generally designated as 26.

The outward displacement of piston 19 or 20 shifts the center of gravity of rotor 26 to one side or to the other of a vertical plane VP containing the axis of rotation 8, thereby causing rotor 26 to reciprocatingly pivot about axis 8.

Each mass 19 or 20 is shifted in response to a pressure change in its associated chamber 10 or 11. The inertia mass 23 passes from one side to the other side of the vertical plane VP when rotor 26 pivots about pivot axis 8. Inertia mass 23 constantly remains above a horizontal plane containing pivot axis 8.

In one position of rotor 26, chamber 10 is located at an upper vertical level and chamber 11 at a lower vertical level, and in the opposite position of rotor 26, chamber 10 is located at the lower level and chamber 11 at the upper level. The upper and lower levels are preferably the same for both chambers 10 and 11.

In the illustrated embodiments, the heating means heat each chamber when it reaches the upper level, and cooling means cool each chamber when it falls to the lower level. The cooling means can be the body of water 3, and the heating means can be sun rays represented by the hollow arrow 27.

In operation, the expansion of the volatile liquid displaces the movable mass associated with the chamber which is at the upper level, thereby generating a moment of gravity force which pivots rotor 26, so that the chamber at the upper level falls by gravity to the lower level, and the same process continuously repeats itself.

Figure 1A:
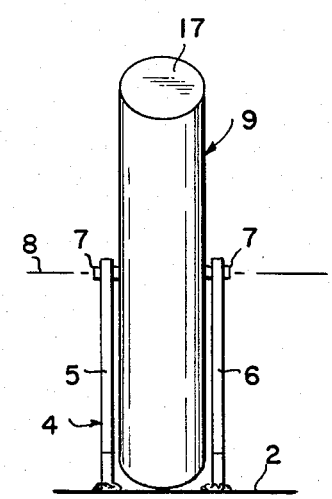
FIG. 1A is a view taken on line A—A of FIG. 1.

With reference now to the drawings in particular, FIGS. 1 and 1A illustrate an engine E-1 whose two chambers 10 and 11 are contained within a single cylinder 9 and the two pistons 19 and 20 are rigidly interconnected by a connecting rod 31. In this embodiment, the coupling member 18 is a solid cylinder 28 through which rod 31 sealingly and slidably extends in an axial direction. Pistons 19 and 20 form movable walls within their respective chambers 10 and 11.

In the position shown in FIG. 1, chamber 11 receives heat from sun rays 27. The pressure rises within chamber 11 so that piston 20 is pushed upwardly. Piston 19 which is rigidly connected to piston 20 also moves upwardly. This upward movement of spool 32, which consists of pistons 19, 20 and of rod 31, is reinforced by the pressure decrease in the opposite cold chamber 10. Chamber 22 contains a compressible fluid which becomes compressed by the upward movement of piston 20. This tends to cushion the impact of piston 20 against the outer end wall 17 towards the end of the piston's stroke.

As spool 32 shifts upwardly, its center of gravity also shifts to the right hand side of vertical plane VP, as viewed in FIG. 1, until a sufficient clockwise torque is developed for rotor 26 to start to pivot in a clockwise direction as represented by the arrow 33 until end wall 17 touches the bottom 2 of tank 1, whereupon chamber 11 will be cooled by the surrounding water 3, and chamber 10 will be heated by the sun rays 27.

The volatile liquid contained within chamber 10 will now expand and push piston 19 upwardly until the center of gravity of spool 32 shifts to the left of vertical plane VP, whereby rotor 26 will pivot counter-clockwise to its initial position shown in FIG. 1.

Figure 2:
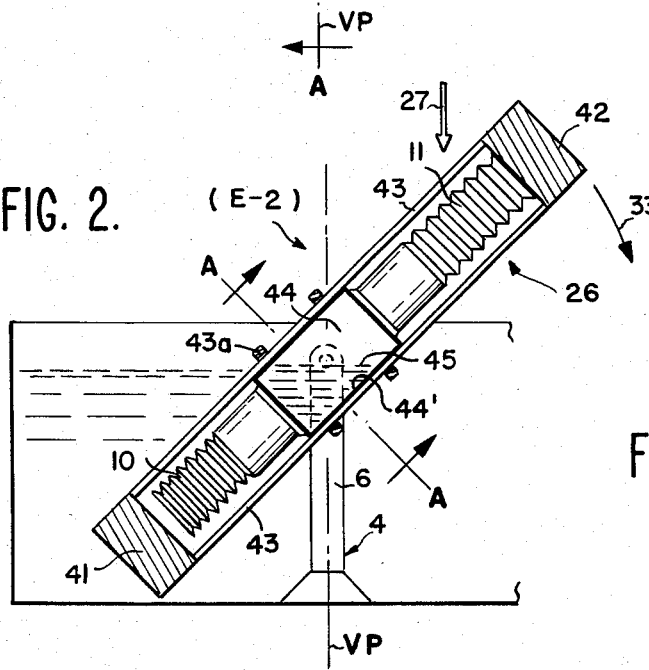
FIG. 2 is a longitudinal schematic representation of another embodiment wherein the masses associated with the chambers are piston like, and the chambers are formed by bellows.
Figure 2A:
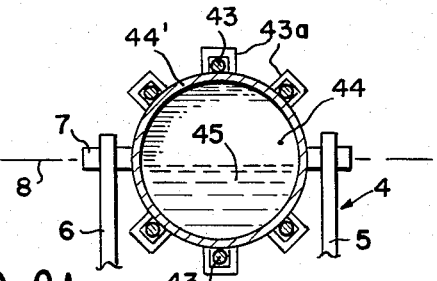
FIG. 2A is a view taken along line A—A of FIG. 2.

FIG. 2 illustrates an engine E-2 having a rotor 26 wherein chambers 10 and 11 have extensible walls formed, for example, of sealed bellows so that the evaporation of the volatile liquid contained therein results in a volume expansion of the bellows. Bellows 10 and 11 are operatively associated with piston-like masses 41 and 42, respectively. In FIG. 2, bellows 11 is shown expanded as a result of the heating by the sun rays 27 of the volatile liquid contained therein, whereas bellows 10 is in its retracted condition as a result of the cooling thereof by the cold water 3.

Masses 41 and 42 are interconnected by several circumferentially-spaced rods 43. Rods 43 slidably extend through brackets 43a which are secured to the external cylindrical wall of tank 44'.

Between chambers 10 and 11 is a central tank 44' having a chamber 44 which is partially filled with an inertia flowing substance 45 such as a liquid or solid particles, for example, sand. Tank 44' serves the same function as the inertia solid mass 23. Just as the inertia mass 23, the flowing substance 45 tends to increase the moment of gravity force applied to shaft 7. The axis of rotation 8 of shaft 7 extends through the center of tank 44'.

In operation of engine E-2, the expansion of chamber 11 pushes upwardly the mass 42, which is rigidly connected to piston 41 through rods 43. The assembly including masses 41, 42 and rods 43, shifts upwardly, and, as viewed in FIG. 2, to the right-hand side of vertical plane VP, thereby producing the fall by gravity of mass 42, whereby rotor 26 pivots in a clockwise direction 33. The flow of the liquid or of the solid particles 45 in tank 44' tends to increase the torque of shaft 7 about its pivot axis 8.

Figure 3:
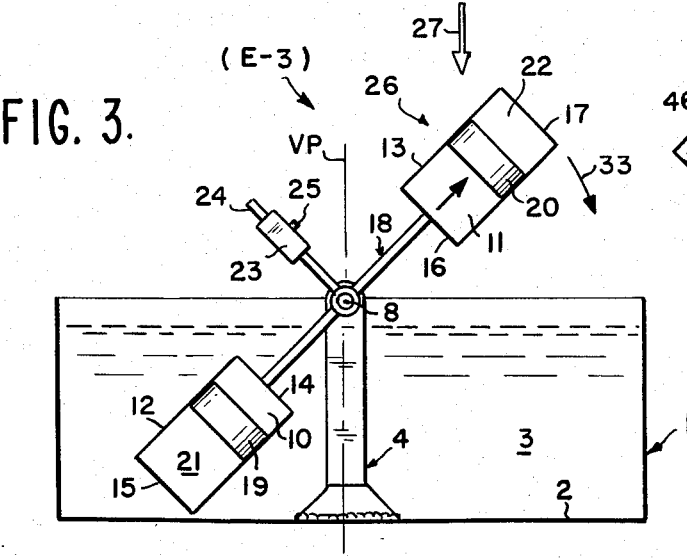
FIG. 3 is a longitudinal schematic representation of another embodiment wherein the pistons are free to move relative to each other.

The engine E-3 shown in FIG. 3 is similar to engine E-1 shown in FIG. 1 except that pistons 19 and 20 in rotor 26 are not interconnected but are freely movable in their respective chambers 10 and 11.

In operation of engine E-3, when the pressure increases in chamber 11, piston 20 moves upwardly compressing the gas contained in chamber 22. The movement of piston 20 displaces the center of gravity of rotor 26 formed by: cylinders 12, 13, interconnecting rod 18, and inertia mass 23. This displacement results in a clockwise rotation 33 which is assisted by the upward movement of piston 19 propelled by the compressed gas in chamber 21 and by the pressure decrease in chamber 10 due to the cooling thereof by the surrounding water body 3.

Figure 4:
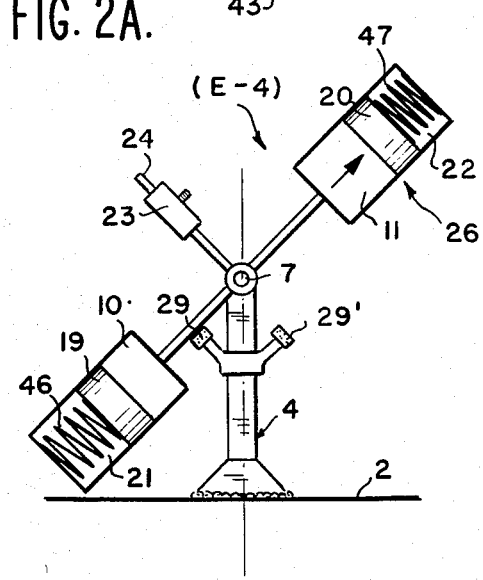
FIG. 4 is a modification of the embodiment shown in FIG. 3.

The engine E-4 shown in FIG. 4 is similar to engine E-3 in FIG. 3 except that the counter pressure in chambers 21, 22 of rotor 26 is obtained by means of compression springs 46, 47, respectively.

Also, stop members 29, 29' are angularly disposed on the opposite sides of support means 4 to limit the angular rotation of shaft 7.

Figure 5:
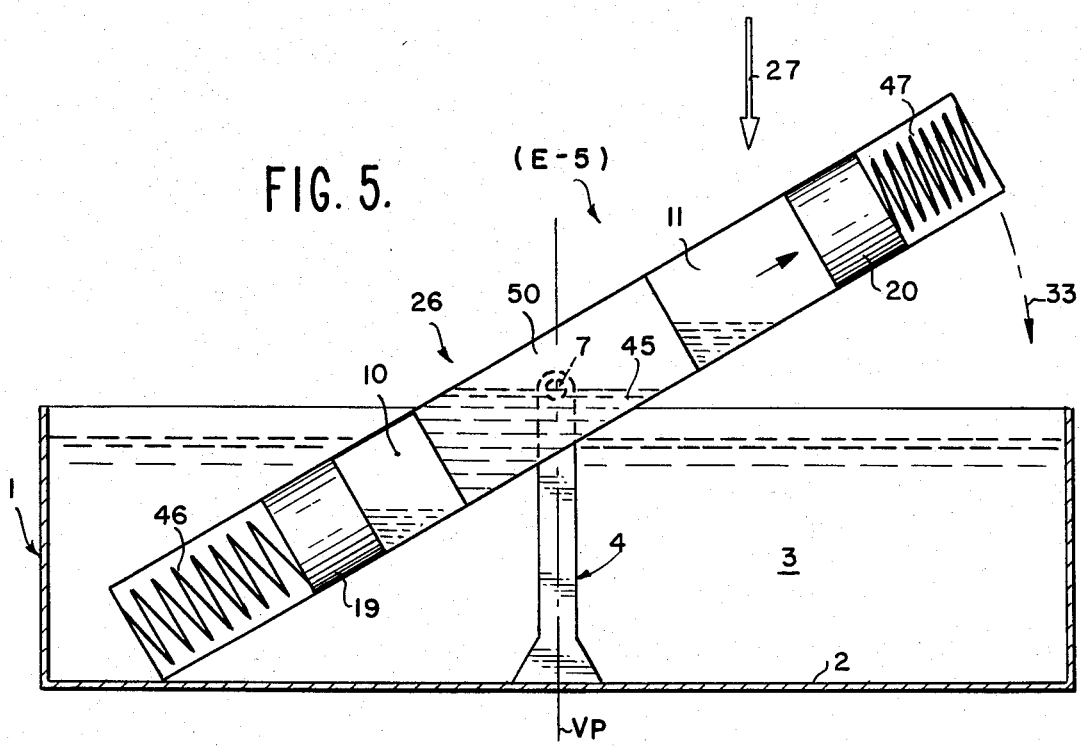
FIG. 5 is a longitudinal schematic representation of a modification of the embodiment shown in FIG. 4.

The engine E-5 shown in FIG. 5 is similar to engines E-2 and E-4. In engine E-5 chambers 10, 11 in rotor 26 are separated by a tank 50 which is partially filled with a flowing substance 45 (liquid or solid particles) serving the same function as that shown in engine E-2 of FIG. 2.

Figure 6:
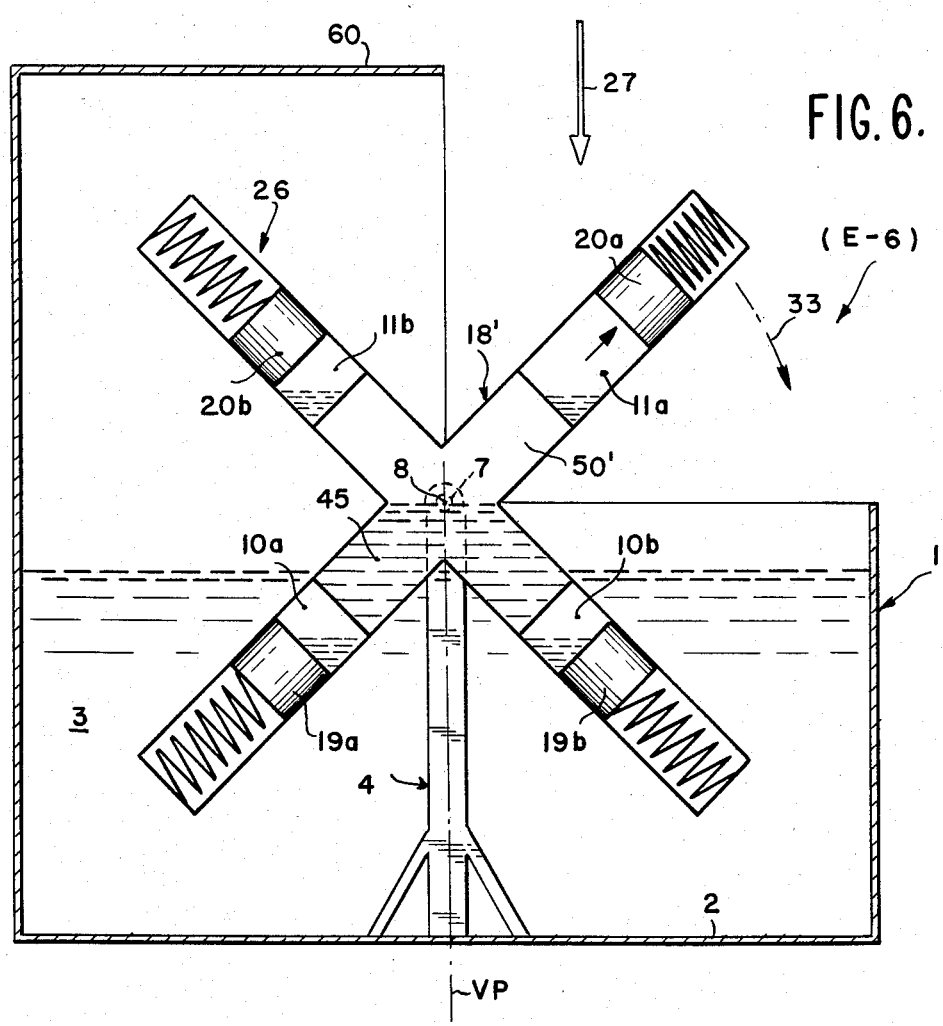
FIG. 6 is a modification of the embodiment shown in FIG. 4.

Engine E-6 shown in FIG. 6, comprises a rotor 26 similar to a combination of two rotors 26, as shown in FIG. 5, that are connected perpendicularly at the centers thereof. Engine E-6 is capable of unidirectional rotation in the clockwise direction 33 instead of reciprocating rocking motion as is the case with the preceding engines E-1 through E-5. One side of the cylindrical wall of tank 1 is extended to provide a top horizontal sun shield 60. Rotor 26 is rotatable about pivot axis 8. The hollow coupling member 18' forms a cross-shaped chamber 50' which is partially filled with an inertia flowing substance 45 which can be, for example, water or sand.

In the position shown in FIG. 6, chambers 10a and 10b are immersed in the cooling liquid 3, chamber 11b is under shield 60, and chamber 11a is being heated. Piston 20a moves radially outwardly against its associated spring. Since chamber 10a is immersed, its fluid is being cooled causing piston 19a to move radially inwardly. Both movements of pistons 19a and 20a result in a corresponding displacement of the center of gravity of rotor 26 to the right of vertical plane VP, thereby inducing a rotation of rotor 26 in a clockwise direction 33. The mechanical torque produced by gravity on the shifted pistons 19a and 20a is increased by the shifting of the inertia flowing mass 45. The developed torque produces rotation which continues until the rotor's center of gravity lies again in the vertical plane VP.

There is thus obtained unidirectional, continuous rotation of the engine's output shaft 7. It will be noted that pistons 19b and 20b stay substantially symmetrical relative to the axis of rotation 8, while their chambers 10b, 11b, respectively, are not being heated. In fact, piston 20b will be a little more distant from the axis 8 than piston 19b, since the temperature is slightly higher in chamber 11b than in chamber 10b. However, piston 20b will be in any case substantially less distant from axis 8 than piston 20a which is subjected to the high pressure developed in chamber 11a by the heat.

It will be appreciated that the unidirectional engine E-6 can be constructed with three rotors at 120° from each other, or more than three rotors.

Figure 7:
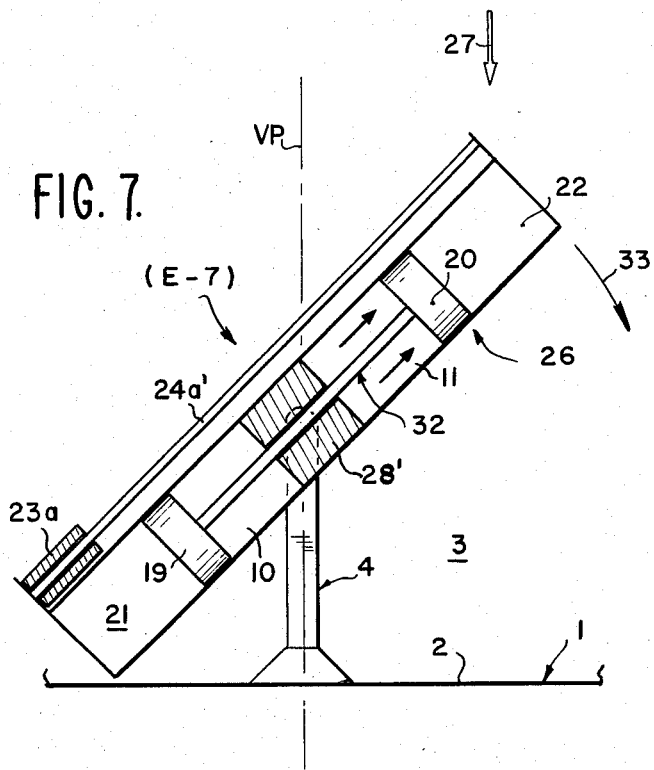
FIG. 7 is a modification of the embodiment shown in FIG. 1.
Figure 8:
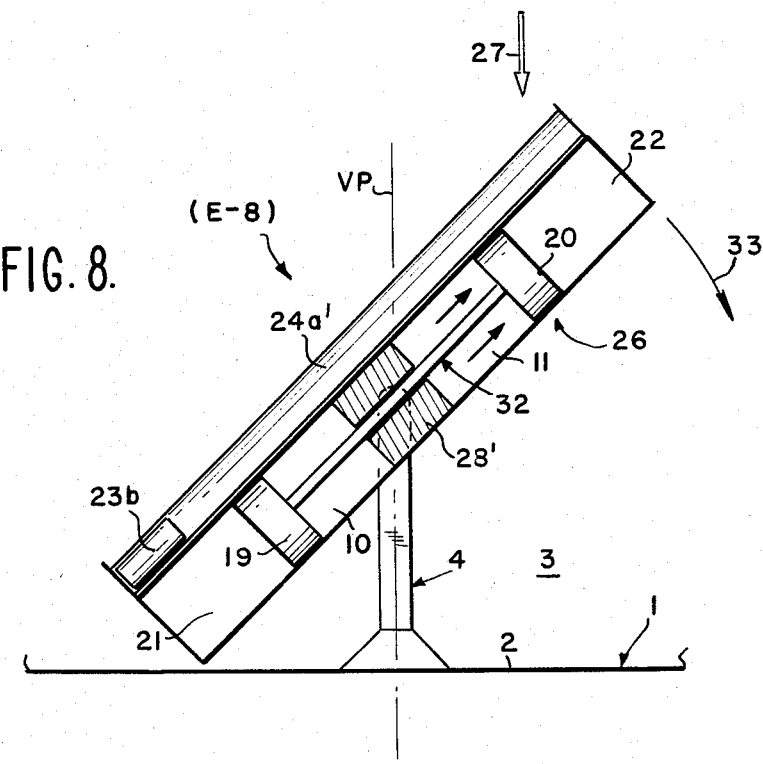
FIG. 8 is a modification of the embodiment shown in FIG. 7.

FIGS. 7 and 8 illustrate that the inertia mass may be slidable along a guide parallel to coupling member 18.

In the engine E-7 of FIG. 7 the guide is a central shaft or rod 24a passing axially through the mass 23a.

In the engine E-8 of FIG. 8 the guide is formed by the inner wall of an enclosure 24a' in which a free mass 23b is housed. The free mass 23b may also consist of a granulated or powdered substance such as sand, or of a liquid such as water. The action of the sliding mass 23b is then similar to that of the inertia flowing mass 45. The mass 23b drops when rotor 26 pivots about pivot axis 8, and its fall produces an additional torque to increase the power available at the rotor's output shaft 7.

It will be appreciated that the inertia flowing substance 45, when it is a liquid, has no direct motive action and forms no part of the activating volatile liquid. Accordingly, the inertia flowing substance 45 serves a different role than that of the volatile liquid or of the intermediary liquid which is transferred from one side to the other side of the rotation axis 8, in known differential temperature engines.

Various other embodiments of the invention will occur to those skilled in the art, without departing from the scope and spirit of the invention as defined in the attached claims.

What is claimed is:

1. A power engine including in combination:
   (a) elongate enclosure means comprising at least two separate fluid-tight enclosures having their respective longitudinal axes substantially aligned;
   (b) a solid mass associated with each enclosure and movable in the longitudinal direction of said enclosures;
   (c) abutment means for limiting the stroke of each solid mass;
   (d) coupling means rigidly interconnecting said enclosures;
   (e) pivot means defining an axis of rotation and pivotally supporting the engine for rotation from a first position, whereat a first enclosure is located at a first level above said axis of rotation, to a second position, whereat said first enclosure is located at a second level below said axis of rotation;
   (f) a motive fluid enclosed within each enclosure, the pressure of said motive fluid varying in response to temperature changes;
   (g) each solid mass being free to move only in response to a pressure change in its associated enclosure in the direction of the longitudinal axis thereof; and
   (h) said engine being responsive to alternating thermal effects which cause alternating variations in the pressures of said enclosures resulting in alternating shifts of the center of gravity of said engine, thereby rotating said engine about said axis of rotation.

2. An engine according to claim 1, and further comprising an inertia mass whose center of gravity shifts from one side to the other side of a vertical plane passing through said axis of rotation, when said engine rotates from said first to said second position.

3. An engine according to claim 2, wherein said inertia mass is a solid.

4. An engine according to claim 2, wherein said inertia mass is a flowing substance, a major portion of said substance flowing from said one side to said other side of said vertical plane when said engine rotates from said first position to said second position.

5. An engine according to claim 1, wherein said motive fluid is a liquid in equilibrium with its vapor phase and whose vapor pressure increases with a temperature increase.

6. An engine according to claim 1, and heating means for producing said alternating thermal effects for heating said enclosures at one of said levels, and cooling means for cooling said enclosures at the other of said levels.

7. An engine according to claim 6, wherein said motive fluid is a liquid boiling below the maximum temperature of the heating means.

8. An engine according to claim 7, wherein said motive fluid is selected from n-butane, isobutane, propane, ethane, methane, methylchloride, ammonia, liquid carbon dioxide, and halogenated hydrocarbons boiling below 20° C.

9. An engine according to claim 6, wherein said heating means is derived from solar energy.

10. An engine according to claim 1, wherein said enclosure means comprises at least one pair of cylindrical enclosures in alignment with each other and with the coupling means, each cylindrical enclosure having, as associated solid mass, a piston displaceable therein in response to a pressure change in said motive fluid.

11. An engine according to claim 1, wherein each enclosure comprises an extensible wall, said enclosure being completely enclosed and adapted to push the external mass associated therewith in response to a pressure increase in the enclosure.

12. An engine according to claim 1, and further comprising a tank associated with said first and second enclosures, said tank being partially filled with a flowing substance serving as an inertia mass for said engine.

13. An engine according to claim 1, wherein said enclosure means comprises at least a third enclosure, said first, second and third enclosures being interconnected through said coupling member at equal angular intervals about said axis of rotation.

14. An engine according to claim 13, wherein said coupling member is hollow and is partially filled with a flowing substance acting as an inertia mass.

15. An engine according to claim 10, wherein the pistons of the two aligned enclosures are rigidly interconnected.

16. An engine according to claim 1, wherein said enclosure means comprises at least one pair of enclosures in alignment with each other and with the coupling means, each enclosure comprising an extensible wall and being completely enclosed and adapted to push the external mass associated therewith in response to a pressure increase in the enclosure, the two masses associated with the two enclosures of each pair being rigidly interconnected.

17. An engine according to claim 1, wherein each movable free mass is housed in its associated enclosure and defines therein a chamber of variable volume containing the motive fluid and a compartment formed by the remaining portion of the enclosure.

18. An engine according to claim 17, wherein each one of said compartments contains resilient means adapted to counterbalance the pressure of the motive fluid in said variable volume chamber.

19. An energy converter of the type primarily used to convert thermal energy into mechanical energy activated by gravity and successive vaporizations and condensations of a low-boiling-point liquid, comprising:
a rotor having a shaft by which the rotor is mounted for rotation about the axis of said shaft;
at least one unit pair of elongate enclosures symmetrically and oppositely disposed on said rotor relative to said axis of rotation and having their respective longitudinal axes substantially aligned;
each enclosure containing a volatile fluid of relatively low boiling point, and each enclosure being fluid-tight without fluid communication between the enclosures;
a solid free mass operatively associated with each elongate enclosure and being movably mounted on each rotor, said mass being free to move only in response to pressure changes in its associated enclosure in the direction of the longitudinal axis thereof; and
thermal supply means operatively disposed relative to said rotor for simultaneously heating one enclosure and cooling the opposite enclosure, thereby cyclically shifting said masses and producing cyclic moments of gravitational force in opposed angular directions which produce said mechanical energy.

20. An energy converter according to claim 19, wherein said two masses associated with said two symmetrical enclosures of a unit pair are rigidly interconnected.

21. The engine according to claim 3, wherein said solid inertia mass is adjustably disposed relative to said axis of rotation to provide an adjustable assist to each solid mass during its stroke for obtaining optimum energy conversion.

* * * * *